United States Patent [19]
Inoue

[11] Patent Number: 6,097,847
[45] Date of Patent: Aug. 1, 2000

[54] METHOD OF AND APPARATUS FOR CALCULATING SHARPNESS OF IMAGE AND APPARATUS FOR SHARPENING IMAGE

[75] Inventor: Akira Inoue, Tokyo, Japan

[73] Assignee: NEC Corporation, Tokyo, Japan

[21] Appl. No.: 08/162,333

[22] Filed: Dec. 7, 1993

[30] Foreign Application Priority Data

May 31, 1993 [JP] Japan ..................................... 5-128571
May 31, 1993 [JP] Japan ..................................... 5-128573

[51] Int. Cl.⁷ ..................................................... G06K 9/40
[52] U.S. Cl. ............................................ 382/266; 382/263
[58] Field of Search ................................ 382/54, 22, 199, 382/254, 260, 266, 263, 272, 273; 348/625, 354, 355

[56] References Cited

U.S. PATENT DOCUMENTS

| | | | |
|---|---|---|---|
| 4,618,990 | 10/1986 | Sieb, Jr. et al. | 382/22 |
| 4,794,531 | 12/1988 | Morishita et al. | 382/54 |
| 4,827,528 | 5/1989 | Macovski | 382/54 |
| 4,953,114 | 8/1990 | Sato | 382/50 |
| 4,967,280 | 10/1990 | Takuma et al. | 348/355 |
| 5,212,516 | 5/1993 | Yamada et al. | 348/354 |
| 5,235,428 | 8/1993 | Hirota et al. | 348/355 |

FOREIGN PATENT DOCUMENTS

| | | | |
|---|---|---|---|
| 449259A2 | 2/1991 | European Pat. Off. | H04N 1/40 |
| 2-287887 | 11/1990 | Japan | G06F 15/68 |
| 3-278284 | 12/1991 | Japan | G06F 15/88 |

OTHER PUBLICATIONS

Digital Image Processing by Rafael C. Gonzalez, Richard E. Woods.

H. Isono, "Objective Evaluation System of Display Image Sharpness", Bulletin of Thesis of the Electric Communication Society of Japan, vol. J70–D, No. 2, 1987, pp. 474–481.

*Primary Examiner*—Matthew Bella
*Attorney, Agent, or Firm*—Foley & Lardner

[57] ABSTRACT

An image sharpness calculation method and apparatus by which sharpness values of many and unspecific images having different degrees of the unsharp condition can be calculated are disclosed. In the method and apparatus, a high frequency component or a high frequency band component of a portion of an input image at which the brightness of the input image exhibits a great variation is extracted, and the thus extracted high frequency component or high frequency band component is integrated to calculate a sharpness. Also an image sharpening apparatus by which optimum sharpening of an image to achieve a high picture quality can be performed automatically is disclosed. The image sharpening apparatus comprises sharpness calculation means for calculating a sharpness of an input image, parameter calculation means for calculating a sharpening parameter based on the thus calculated sharpness, and emphasis means for emphasizing brightness of the input image based on the thus calculated sharpening parameter.

10 Claims, 10 Drawing Sheets

(A)          (B)

S1: EDGE POINT HIGH FREQUENCY COMPONENT

METHOD OF AND APPARATUS FOR CALCULATING SHARPNESS OF IMAGE AND APPARATUS FOR SHARPENING IMAGE

BACKGROUND OF THE INVENTION

1. Field of the Invention

This invention relates to an image sharpness calculation method and apparatus for calculating a sharpness of an image in a television receiver, a scanner, a facsimile, a printer or a like apparatus and an image sharpening apparatus for adjusting the sharpness of an image in response to a thus calculated sharpness of the image.

2. Description of the Related Art

One of methods employed to calculate a sharpness of an image is calculation of an acutance. The output of a system when a step function is inputted to the system is called edge spread function (ESF), and according to the method, an edge spread function of an object image is calculated first. Where the edge spread function is represented by h(x), the acutance A is represented by the following equation (1):

$$A = \frac{1}{h(b)-h(a)} \int_a^b \left(\frac{dh}{dt}\right) dx \qquad (1)$$

where a and b are an upper end and a lower end of an edge of the output, respectively.

Meanwhile, several methods for caculation of a sharpness are based on a magnitude transfer function (MTF) of an object image. According to "Objective Evaluation System of Display Image Sharpness", *Bulletin of Thesis of the Electric Communication Society of Japan*, Vol. J70-D, No. 2, 1987, pp.474–481, the methods are generally represented by the following equation (2):

$$SM = \frac{\int \{R(f) \cdot E(f)\}^n df}{\int E^n(f) df} \qquad (2)$$

where f is a spatial frequency, n is a positive integral number (normally 1 or 2), R(f) is a magnitude transfer function of the entire system, and E(f) is a magnitude transfer function of the vision.

In short, a sharpness is determined as a value obtained by normalizing an integral value of a transfer function of a system with an integral value of a transfer function of the vision.

Further, one of methods of sharpening an image is unsharp masking.

The unsharp masking is a process of multiplying a difference of an unsharp image $f^-$ from an original image f by a constant and adding the product to the original image f. The process is represented by the following equation (3):

$$fs = f + k(f - f^-) \qquad (3)$$

$f-f^-$ in the equation (3) above represents a high frequency component of the image since a low frequency component of the image is subtracted from the image. Therefore, the unsharp masking is a method of sharpening an image by multiplying a high frequency component of the image by a constant and adding the product to the original image. Generally, sharpening signifies emphasis of a high frequency component, and if the equation (3) is generalized as a sharpening method, where a high frequency filter is represented by gs, the unsharp masking is represented by $$fs = f + k(f * gs) \qquad (4)$$

where * represents a convolution. This applies similarly in the following description.

An improvement in the unsharp masking is disclosed, for example, in Japanese Patent Laid-Open Application No. Heisei 3-278284 wherein the sharpness is emphasized in response to the output of an edge detection filter which only detects an edge of an image. In the image sharpness emphasis method, the edge detection filter is applied to a neighboring region of each picture element. Then, the coefficient k of the equation (3) regarding the picture element is calculated as a function of the output value of the edge detection filter. In short, the value of the coefficient k is varied for each picture element in accordance with a situation in the proximity of the picture element thereby to prevent possible deterioration of the picture quality which may be caused by emphasis of the graininess at a flat portion of the image.

However, the conventional image sharpness calculation method is disadvantageous in that the sharpness cannot be measured unless an edge spread function or a magnitude transfer function of an object image is known. And, a considerable number of steps are required for measurement of such function. Further, the conventional image sharpness calculation method cannot be applied to an image whose nature of deterioration is quite unknown.

Meanwhile, the conventional unsharp masking is disadvantageous in that, in order to accurately adjust two parameters including a high frequency component (f*gs in the equation (4)) to be emphasized and a coefficient (k in the equation (4)) for multiplication by a constant in response to the degree of the unsharp condition of an image, normally an operator must visually confirm several images one by one to find out optimum values for the two parameters.

This is because, since sharpening is performed in order to improve the picture quality of an image, when the degree of the unsharp condition of the image is, for example, considerably high, the coefficient k must be a high value, but on the contrary when the degree of the unsharp condition of the image is not considerably high, the coefficient k must be a low value. In short, in order to achieve a high picture quality by means of sharpening, the parameters of sharpening must be varied in response to the degree of the unsharp condition of the image.

The disadvantage Just described resides similarly in the method disclosed in Japanese Patent Laid-Open Application No. Heisei 3-278284. According to the method, the function (which is in the form of a lookup table in the disclosure) of the output of the edge detection filter for calculating the coefficient k for each picture element must necessarily be varied in response to the degree of the unsharp condition of the image. Consequently, the method is disadvantageous in that images may be visually confirmed one by one similarly as in the unsharp masking.

The disadvantages described above do not matter very much if the degree of the unsharp condition of an image to be sharpened is limited to some degree. This is because, since also the optimum values of parameters of sharpening are limited, images need not be visually confirmed one by one to vary the parameters. Further, even if the degree of the unsharp condition of an image to be sharpened is not limited, if the degree of the unsharp condition can be measured numerically, then the parameters of sharpening may be varied in response to the value of the degree of the unsharp condition, and consequently, the disadvantages described above do not matter.

However, images actually inputted to scanners, copying machines and so forth have various unsharp conditions, and it is impossible to restrict the degrees of the unsharp conditions. Further, while, in order to numerically restrict the degree of the unsharp condition, conventionally a mechanism of the unsharp condition of the image (transfer function of the image) must generally be known, the mechanism of the unsharp condition is unknown as regards most images inputted to a scanner, a copying machine or the like.

From the circumstances described above, the conventional methods are disadvantageous in that, in order to sharpen many and unspecific images having different degrees of the unsharp condition to assure a high picture quality, an operator must visually confirm the images one by one by trial and error to determine sharpening parameters.

Further, in order to determine such optimum sharpening parameters, the skill and the experience are conventionally required for an operator, and the conventional methods are disadvantageous also in that it is very difficult for a person who does not have such skill or knowledge to determine optimum parameters.

SUMMARY OF THE INVENTION

It is an object of the present invention to provide an image sharpness calculation method and apparatus by which sharpness values of many and unspecific images having different degrees of the unsharp condition can be calculated.

It is another object of the present invention to provide an image sharpening apparatus by which optimum sharpening of an image to achieve a high picture quality can be performed automatically.

In order to attain the objects described above, according to an aspect of the present invention, there is provided a method of calculating a sharpness of an input image, which comprises the steps of extracting a high frequency component or a high frequency band component of a portion of the input image at which the brightness of the input image exhibits a great variation, and integrating the thus extracted high frequency component or high frequency band component.

The extraction step may comprise the steps of extracting a portion of the input image at which the brightness of the input image exhibits a great variation as an edge region, calculating an area of the thus extracted edge region and extracting a high frequency component or a high frequency band component of the input image, and at the integration step, the thus extracted high frequency component or high frequency band component may be integrated for the edge region. In this instance, the method further comprises the step of normalizing the integral value with the area.

Or, the extraction step may comprise the steps of extracting a portion of the input image at which the brightness of the input image exhibits a great variation as an edge-likeness, extracting a high frequency component or a high frequency band component of the input image and weighting the thus extracted high frequency component or high frequency band component with the edge-likeness, and at the integration step, the weighted high frequency component or high frequency band component may be integrated in the edge region.

Alternatively, the extraction step may include the steps of extracting a high frequency component or a high frequency band component of the input image, processing the thus extracted high frequency component or high frequency band component with a threshold value to extract a portion of the input image at which the brightness of the input image exhibits a great variation and calculating an area of the edge region, and at the integration step, the extracted high frequency component or high frequency band component may be integrated in the edge region. In this instance, the method further comprises the step of normalizing the integral value with the area.

Preferably, the method further comprises the step, prior to the extraction step, of setting a window for the input image to limit a reference region within which the frequency component or frequency band component should be extracted at the subsequent extraction step.

According to another aspect of the present invention, there is provided an apparatus for calculating a sharpness of an input image, which comprises edge extraction means for extracting a portion of the input image at which the brightness of the input image exhibits a great variation, high frequency filter means for extracting a high frequency component or a high frequency band component of the input image, and integration means for integrating the extracted high frequency component or high frequency band component in the portion of the input image extracted by the edge extraction means.

According to a further aspect of the present invention, there is provided an apparatus for calculating a sharpness of an input image, which comprises edge-likeness extraction means for extracting a portion of the input image at which the brightness of the input image exhibits a great variation as an edge-likeness, high frequency filter means for extracting a high frequency component or a high frequency band component of the input image, weighting means for weighting the thus extracted high frequency component or high frequency band component with the edge-likeness from the edge-likeness extraction means, and integration means for integrating the thus weighted value from the weighting means.

According to a still further aspect of the present invention, there is provided an apparatus for calculating a sharpness of an input image, which comprises edge region extraction means for extracting a portion of the input image at which the brightness of the input image exhibits a great variation as an edge region, edge area calculation means for calculating an area of the thus extracted edge region, high frequency filter means for extracting a high frequency component or a high frequency band component of the input image, integration means for integrating the thus extracted high frequency component or high frequency band component, and normalization means for normalizing the integral value from the integration means with the area of the edge region from the edge area calculation means to calculate a sharpness.

According to a yet further aspect of the present invention, there is provided an apparatus for calculating a sharpness of an input image, which comprises high frequency filter means for extracting a high frequency component or a high frequency band component of the input image, threshold value processing means for processing the thus extracted high frequency component or high frequency band component with a threshold value to extract an edge region of the input image at which the brightness of the input image exhibits a great variation, integration means for integrating the extracted high frequency component or high frequency band component, edge area calculation means for calculating an area of the thus extracted edge region, and normalization means for normalizing the integral value from the integration means with the area calculated by the edge area calculation means.

Preferably, any of the apparatus for calculating a sharpness of an input image described above further comprises window setting means for limiting a reference region of the input image within which the frequency component or frequency band component should be extracted.

With the method of and apparatus for calculating a sharpness of an input image according to the present invention, a sharpness which is used to sharpen an input image is calculated from an average intensity of a high frequency component or a high frequency band component in an edge region of the input image, that is, a portion of the input image at which the brightness of the input image exhibits a great variation. Consequently, even when the mechanism which causes an unsharpness of the input image is unknown, an optimum parameter of sharpening can be calculated automatically. Accordingly, no skilled operator is required, and a cumbersome operation for an operator to visually confirm images one by one to determine a parameter can be eliminated. In particular, for many and unspecific images having different degrees of unsharpness, optimum parameters of sharpening can be calculated automatically in a short period of time.

According to a yet further aspect of the present invention, there is provided an apparatus for sharpening an input image, which comprises sharpness calculation means for extracting a high frequency component or a high frequency band component of a portion of the input image at which the brightness of the input image exhibits a great variation and integrating the thus extracted high frequency component or high frequency band component to calculate a sharpness, parameter calculation means for calculating a sharpening parameter based on the thus calculated sharpness, and emphasis means for emphasizing brightness of the input image based on the thus calculated sharpening parameter.

The sharpness calculation means may be any of the apparatus for calculating a sharpness of an input image described above.

Preferably, the parameter calculation means outputs a high frequency filter parameter and a high frequency emphasis coefficient as the sharpening parameters therefrom, and the emphasis means includes emphasizing high frequency filter means for extracting a high frequency component or a high frequency band component of the input image using the high frequency filter parameter, multiplication means for multiplying an output of the emphasizing high frequency filter means by the high frequency emphasis coefficient, and addition means for adding the input image to an output of the multiplication means.

Or, the parameter calculation means may output a high frequency emphasis coefficient as the sharpening parameter therefrom, and the emphasis means may include multiplication means for multiplying an output of the sharpness calculation means by the high frequency emphasis coefficient, and addition means for adding the input image to an output of the multiplication means.

The sharpness calculation means may include edge region extraction means for extracting a portion of the input image at which the brightness of the input image exhibits a great variation as an edge region, edge area calculation means for calculating an edge area from an output of the edge region extraction means, first high frequency filter means for extracting a first high frequency component or a first high frequency band component of the input image, first integration means for integrating an output of the first high frequency filter means for the edge region, second high frequency filter means for extracting a second high frequency component or a second high frequency band component from the output of the first high frequency filter means, and second integration means for integrating an output of the second high frequency filter means for the edge region, and the parameter calculation means may include emphasis coefficient calculation means for calculating a high frequency emphasis coefficient from an object sharpness inputted thereto in advance, the output of the edge area calculation means, the output of the first high frequency intensity integration means and an output of the second high frequency intensity integration means while the emphasis means includes multiplication means for multiplying the output of the first high frequency filter means by an output value of the emphasis coefficient calculation means, and addition means for adding an output of the multiplication means and the input image to obtain an output image. In this instance, the edge region extraction means of the sharpness calculation means may include threshold value processing means for processing the output of the first high frequency filter means with a threshold value to extract an edge region.

Preferably, the apparatus for sharpening an input image further comprises a selector for selecting whether an output image of the apparatus should be inputted to the parameter calculation means to calculate a high frequency emphasis coefficient again or should be outputted as it is, and discrimination means for comparing a high frequency emphasis coefficient used to calculate the output image and another high frequency emphasis coefficient used to obtain an output image in the last cycle with each other to discriminate whether or not repetitive calculation for a high frequency emphasis coefficient should be continued and instructing the selector of the determination.

Where the input image is a moving picture, the apparatus for sharpening an input image further comprises image sampling means for sampling the input moving picture for each n frames, n being a positive integral number.

Preferably, the apparatus for sharpening an input image further comprises window setting means for limiting a reference region of the input image for calculation of a sharpness.

With the apparatus for sharpening an input image according to the present invention, a sharpness is calculated from an average intensity of a high frequency component or a high frequency band component in an edge region of an input image, that is, a portion of the input image at which the brightness of the input image exhibits a great variation, and sharpening is performed based on the thus calculated sharpness. Consequently, even when the mechanism which causes an unsharpness of the input image is unknown, an optimum parameter of sharpening can be calculated automatically. Accordingly, no skilled operator is required, and a cumbersome operation for an operator to visually confirm images one one by to determine a parameter can be eliminated. In particular, for many and unspecific images having different degrees of unsharpness, optimum parameters of sharpening can be calculated and optimum sharpening of the input image for a high picture quality can be performed automatically in a short period of time.

Where the image sampling means is provided, the apparatus for sharpening an input image can be applied not only to a still picture but also to a moving picture. Consequently, the apparatus for sharpening an input image can be applied to all sorts of image inputting, image transmission and/or image outputting apparatus including a printer, a scanner, a facsimile and a copying machine.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 14:
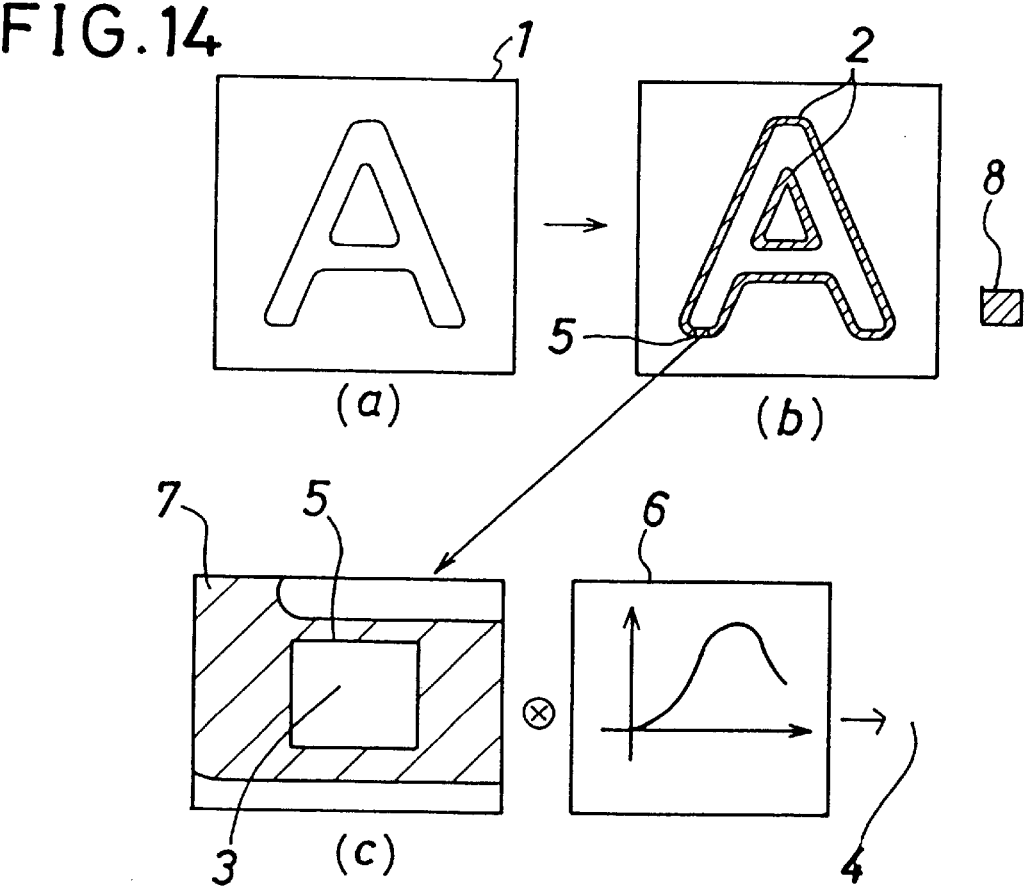
FIG. 14 is a diagrammatic view illustrating the principle of an image sharpness calculation method according to the present invention.

First, the principle of an image sharpness calculation method according to the present invention will be described with reference to FIG. 14.

According to the present invention, an edge region 2 of an input image 1 is extracted, and an average of a high frequency component in the edge region 2 is determined as a sharpness. As a method of extracting such edge region, a method wherein the output of a first order differential filter, a second order differential filter, a high frequency filter, a high frequency band filter or a like filter is processed with a threshold value may be applied.

Subsequently, a certain point in the edge region 2 is set as an edge point 3, and a high frequency component 4 at the edge point 3 is extracted. In order to extract such high frequency component 4, a high frequency band filter 6 may be applied to an edge point neighboring region 5 of the edge point 3.

Then, the intensity of the edge point high frequency component 4 is integrated at all points in an edge region 7 to obtain a high frequency intensity of the entire edge region 2. The value of the high frequency intensity is normalized with an edge area 8 to obtain a sharpness.

An example of a definition equation of the sharpness is given below:

$$S = \frac{\int\int E(f)|f*ss|dxdy}{AE(f)} \quad (5)$$

where f is an image, S is a sharpness, E(f) is an edge region, AE(f) is the area of the edge region, and ss is a high frequency band filter. The high frequency band filter ss corresponds to the high frequency band filter 6 in FIG. 14. It is to be noted that, while the absolute value of a high frequency component f*ss is employed as the intensity of the high frequency component, a squared value of the high frequency component may alternatively be employed as the definition of the intensity as in the following equation (6):

$$S = \frac{\int\int E(f)(f*ss)^2 dxdy}{AE(f)} \quad (6)$$

As a method of extracting the edge region E(f), the output of a first order differential filter, a second order differential filter, a high frequency filter or a like filter may be processed with a threshold value.

The high frequency band filter ss used for the definition of the sharpness in the equation (5) provides a weight to the sharpness of each spatial frequency component as the sharpness of that spatial frequency component is recognized by the visual sense of a human being. Meanwhile, a high frequency filter having no high frequency band cutoff function may be employed for the high frequency band filter ss.

Subsequently, another image sharpness calculation method will be described. The present method involves expansion of the principle of the image sharpness calculation method described above.

Information regarding a sharpness of an image is included in a portion of the image which exhibits a great variation in brightness. This can be recognized from the fact that, when an unsharp image and a sharp image are compared with each other with the same pattern, it can be seen that there is an obvious difference between them at a portion at which a great variation in brightness is exhibited, but there is no significant difference between them at a portion at which little variation in brightness is exhibited.

Making use of this fact, attention is paid to a portion which exhibits a great variation in brightness from within brightness information of an input image. Meanwhile, it is already known that, when an image is divided into a plurality partial regions, generally a sharp region includes a high frequency component by a comparatively great amount. Accordingly, a sharpness can be calculated from brightness information of an input image by using a local high frequency component at a portion at which the brightness exhibits a great variation.

Therefore, the degree of variation of the brightness at each partial region of an image will be hereinafter referred to as edge-likeness, and a sharpness is calculated from an average within an image of a high frequency component in the partial regions. In short, a sharpness of an image is defined as an integral value of values obtained by weighting the intensities of a high frequency component in the partial regions with an edge-likeness.

In order to calculate an edge-likeness of each portion of an image, an edge detection filter may be applied to the image. Alternatively, a dispersion or the like of brightness values of local regions may be employed instead. An example of definition equation of a sharpness in the sharpness calculation method of the present invention is given by the equation (7) below:

$$S = \frac{\int\int |f*ee| + |f*ss| dx dy}{\int\int |f*ee| dx dy} \quad (7)$$

where S is a sharpness, f is an input image, ee is a detection filter for an edge-likeness, and ss is a high frequency filter or high frequency band filter. |f*ee| represents a process of detecting an edge-likeness from the input image f in a general form.

As the high frequency band filter ss used in the sharpness definition of the equation (7), a high frequency band filter provides a weight to the sharpness of each spatial frequency component as the sharpness of that spatial frequency component is recognized by the visual sense of a human being. Further, a high frequency filter having no high frequency band cutoff function may be employed for the high frequency band filter ss.

Subsequently, an image sharpening method will be described.

The image sharpening method Includes calculation of a sharpness only from brightness information of an input image and sharpening of the input image based on the value of the sharpness.

Various parameters for sharpening (hereinafter referred to as "sharpening parameters") are calculated based on a sharpness determined in such a manner as described above, and sharpening is performed based on any of the parameters. Major ones of the sharpening parameters are the size of a high frequency emphasis filter and the high frequency emphasis amount. The high frequency emphasis filter corresponds to gs in the equation (4), and the high frequency emphasis amount corresponds to k. When, for example, the sharpness S is high, it is not necessary to emphasize a high frequency very much, and accordingly, the size of gs is reduced and also the value of the emphasis coefficient k is reduced. On the contrary when the sharpness S is low, the size of gs is increased and also the value of the emphasis coefficient k is increased.

Figure 15:
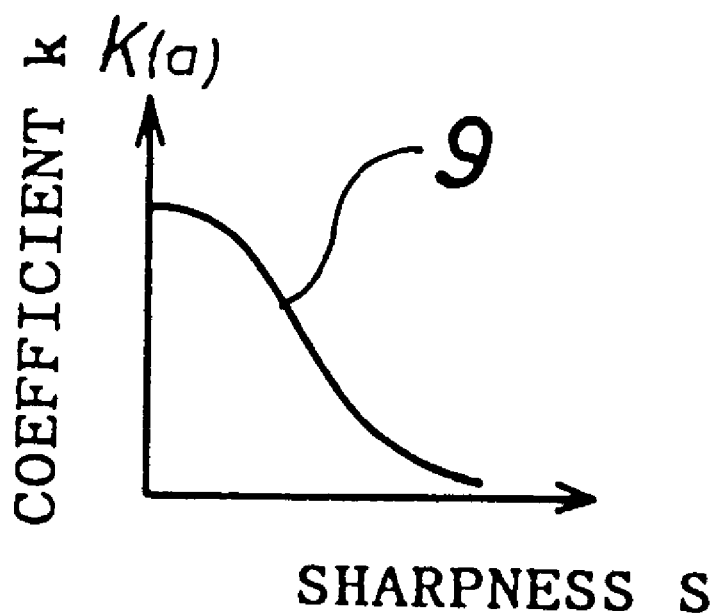
FIG. 15 is a characteristic diagram showing an example of a function used for calculation of a parameter.

As a method of calculating a sharpening parameter, where the sharpening parameter is represented as k, a function 9 illustrated in FIG. 15 may be prepared to determine k based on k=K(S) (S is a sharpness). By the method described so far, optimum sharpening can be achieved automatically in response to an input image.

A second image sharpening method involves determination of the degree of variation in brightness at each portion of an image as an edge-likeness, determination of an integral value of values obtained by weighting intensities of a high frequency component of the partial regions with an edge-likeness as a sharpness of the image and sharpening of the image based on the sharpness.

In order to determine an edge-likeness of each portion of an image, an edge detection filter may be applied to the image. Alternatively, a dispersion or the like of brightness values of the local regions may be taken. An example of a definition equation of a sharpness in the image sharpening method of the present invention is given by the equation (8) below:

$$S = \frac{\int\int |f*ee| + |f*ss| dx dy}{\int\int |f*ee| dx dy} \quad (8)$$

where S is a sharpness, f is an input image, ee is an edge-likeness detection filter, and ss is a high frequency filter or high frequency band filter. |f*ee| represents a process of detecting an edge-likeness from the input image f in a general form.

As the high frequency band filter ss used in the sharpness definition of the equation (8), a high frequency band filter providing a weight to the sharpness of each spatial frequency component as the sharpness of that spatial frequency component is recognized by the visual sense of a human being, is employed. Further, a high frequency filter having no high frequency band cutoff may be employed for the high frequency band filter ss.

Sharpening is performed based on a sharpness determined in such a manner as described above. The details of the method are such as described above in the first sharpening method.

A third image sharpening method corresponds to a special case of the second image sharpening method. First, attention is paid only to an edge region as a portion in which the intensity of an input image exhibits a great variation, and an average (which is determined as a sharpness) of the intensity of a high frequency component in the edge region. Then, the sharpening parameters are determined based on the average value, and sharpening is performed based on any of the sharpening parameters.

While the first to third image sharpening methods are described above in connection with two-dimensional processing, the image sharpening method of the present invention may alternatively be performed for each one line (in the vertical direction or the horizontal direction).

Figure 1:
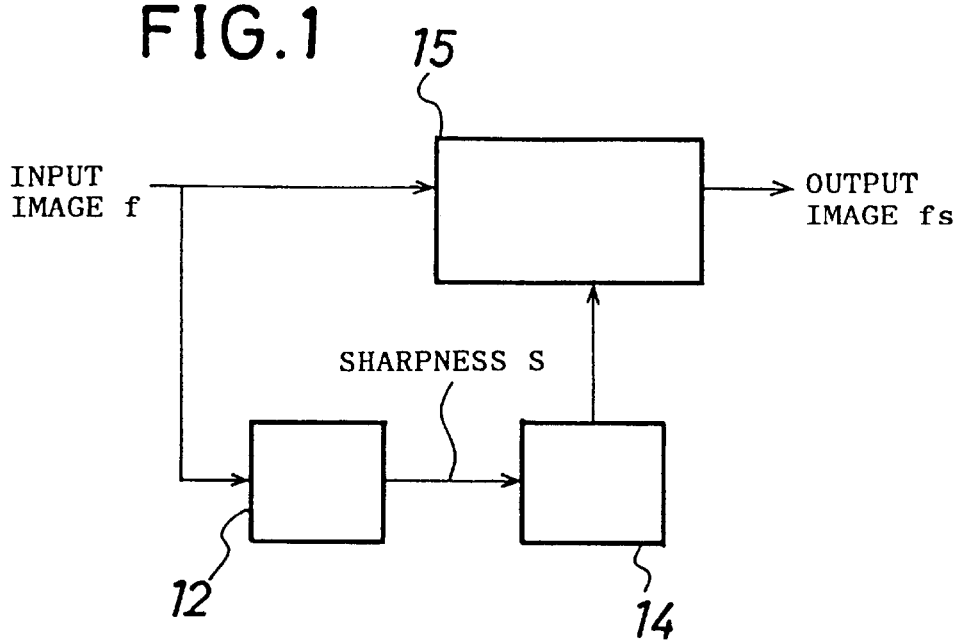
FIG. 1 is a block diagram showing a basic construction of an image sharpening apparatus according to the present invention.

Subsequently, an image sharpening apparatus will be described. FIG. 1 shows a basic construction of an image sharpening apparatus according to the present invention. Referring to FIG. 1, the sharpening apparatus shown includes sharpness calculation means 12 for calculating a sharpness S based on a high frequency component or a high frequency band component at a portion of an input image f at which the brightness of the input image f exhibits a great variation, parameter calculation means 14 for calculating a sharpening parameter based on the sharpness S calculated by the sharpness calculation means 12, and emphasis means 15 for emphasizing the brightness of the input image f based on the sharpening parameter calculated by the parameter calculation means 14.

The sharpness calculation means 12 may be, for example, a microcomputer in which the calculation method described above is programmed.

The parameter calculation means 14 calculates a sharpening parameter for correction of the brightness value of the input image f from a sharpness S inputted thereto, and sends out the sharpening parameter to the emphasis means 15. The sharpening parameter may be the size (in terms of the number of picture elements in a horizontal and vertical direction) or the emphasis coefficient of a high frequency filter employed to emphasize the input image f by high frequency emphasis. Meanwhile, depending upon the value of the sharpness S, not a command of emphasis of a high frequency but a command of cutting off of a high frequency or conversion into a histogram may be sent out.

The emphasis means 15 is programmed so as to interpret a sharpening parameter inputted thereto and perform a designated process for picture element values of the input image f.

In the image sharpening apparatus of the construction described above, the sharpening calculation means 12 calculates a sharpness S based on brightness information of an input image f and outputs the sharpness S to the parameter calculation means 14. The parameter calculation means 14 calculates a sharpening parameter based on the sharpness S inputted thereto and outputs the sharpening parameter to the emphasis means 15. The emphasis means 15 processes the input image f by emphasis processing based on the sharpening parameter inputted thereto to produce an output image fs.

Figure 2:
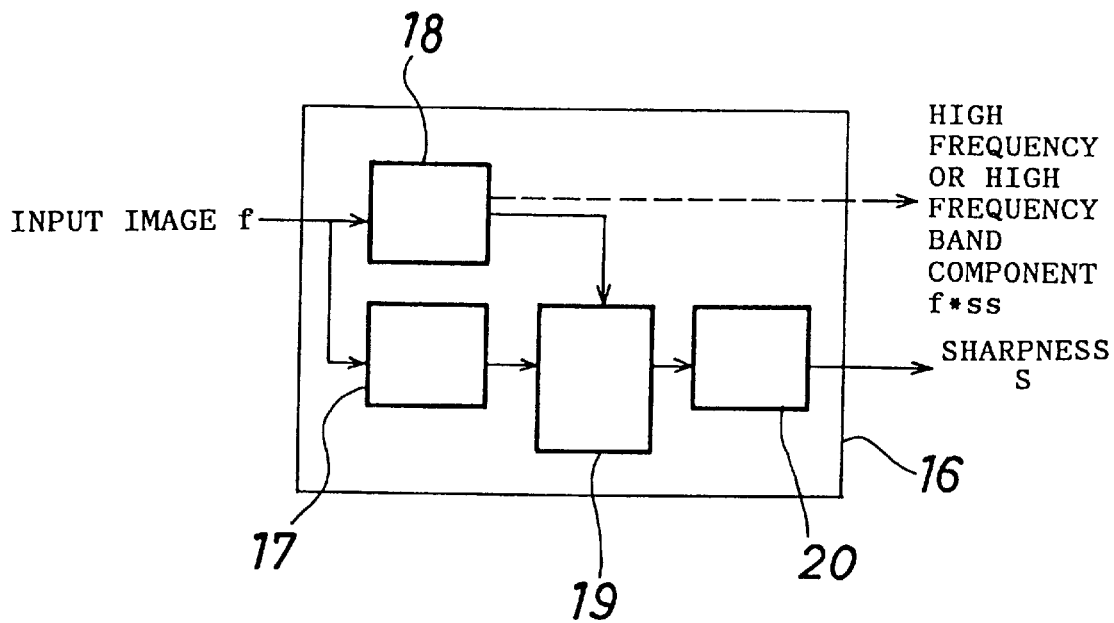
FIG. 2 is a block diagram showing an image sharpness calculation apparatus included in the image sharpening apparatus of FIG. 1.

Subsequently, various forms of the image sharpness calculation means will be described. FIG. 2 shows a first form of the image sharpness calculation means. Referring to FIG. 2, the image sharpness calculation means shown is generally denoted at 16 and includes edge-likeness extraction means 17 for extracting a portion of an input image f at which the brightness of the input image f exhibits a great variation as an edge-likeness, high frequency filter means 18 for extracting a high frequency component or a high frequency band component of the input image f, weighting means 19 for weighting the high frequency component or high frequency band component extracted by the high frequency filter means 18 with the edge-likeness extracted by the edge-likeness extraction means 17, and intensity integration means 20 for integrating the intensity of the high frequency component or high frequency band component weighted by the weighting means 19 in the image.

The high frequency filter means 18 applies a filter representative of a weight to a sharpness of each spatial frequency component to a human being. Accordingly, the high frequency filter means 18 is preferably constituted from a high frequency band filter having a high frequency band cutoff function corresponding to spatial frequencies of the vision, but may be constituted from a high frequency filter having no high frequency band cutoff function.

The edge-likeness extraction means 17 may be constituted from a first order or second order differential edge detection filter or means for calculating a local dispersion of the brightness.

When an input image f is inputted to the image sharpening apparatus which employs the image sharpness calculation means 16, a high frequency component or a high frequency band component of the input image f is extracted by the high frequency filter means 18 in the image sharpness calculation means 16. Simultaneously, an edge-likeness of the input image f is extracted by the edge-likeness extraction means 17. Then, the high frequency component or high frequency band component of the input image f and the edge-likeness are outputted to the weighting means 19. The weighting means 19 weights the high frequency component or high frequency band component with the edge-likeness and outputs a result of the weighting to the intensity integration means 20. Usually, the high frequency component or high frequency band component is multiplied by the edge-likeness. The intensity integration means 20 either squares the inputted weighted high frequency component or high frequency band component or calculates an absolute value of the same to produce a high frequency intensity, performs integration of the high frequency intensity within the image to calculate a sharpness S and outputs the sharpness S to the parameter determination means 14. The parameter determination means 14 calculates, from the inputted sharpness S, a sharpening parameter for correcting the brightness value of the input image f and sends out the sharpening parameter to the emphasis means 15. The emphasis means 15 interprets the thus inputted sharpening parameter and processes picture element values of the input image f by a process designated by the sharpening parameter.

Figure 3:
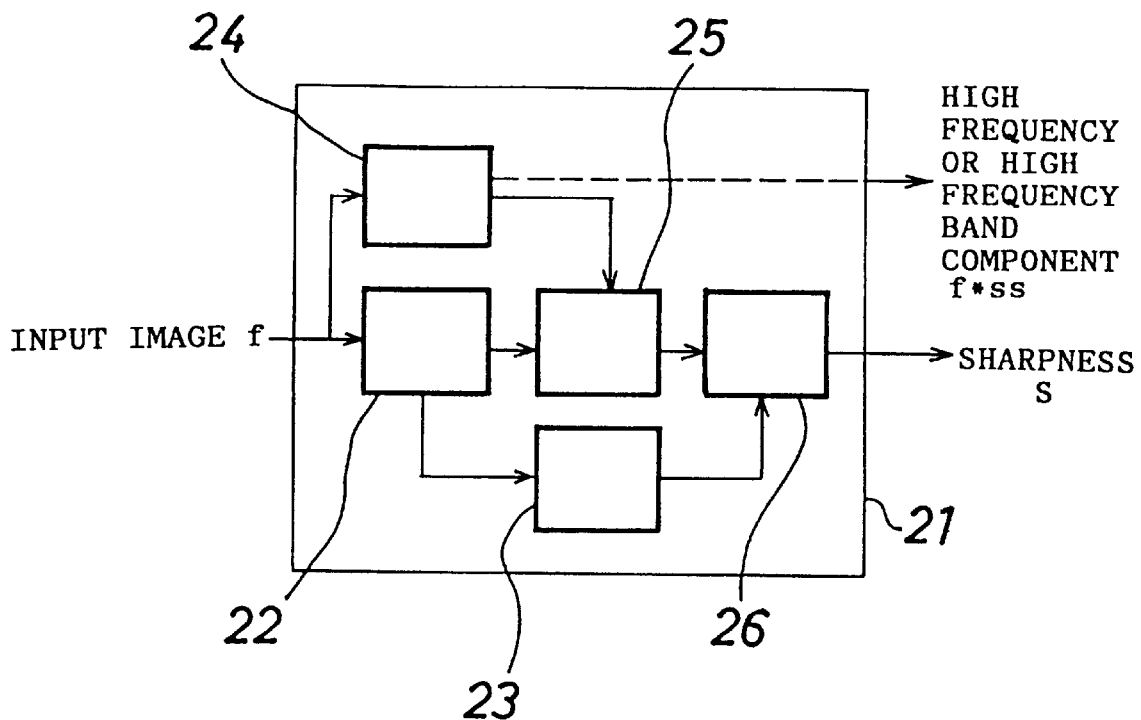
FIG. 3 is a similar view but showing another image sharpness calculation apparatus.

Referring now to FIG. 3, a second form of the image sharpness calculation means is shown. The image sharpness calculation means is generally denoted at 21 and includes edge region extraction means 22 for extracting an edge region of an input image f, edge area calculation means 23 for extracting the area of the thus extracted edge region, high frequency filter means 24 for extracting a high frequency component or a high frequency band component of the input image f, high frequency intensity integration means 25 for integrating the intensity of the thus extracted high frequency component or high frequency band component, and normalization means 26 for normalizing the thus integrated intensity of the high frequency component or high frequency band component with the area of the edge region to calculate a sharpness S.

Figure 5:
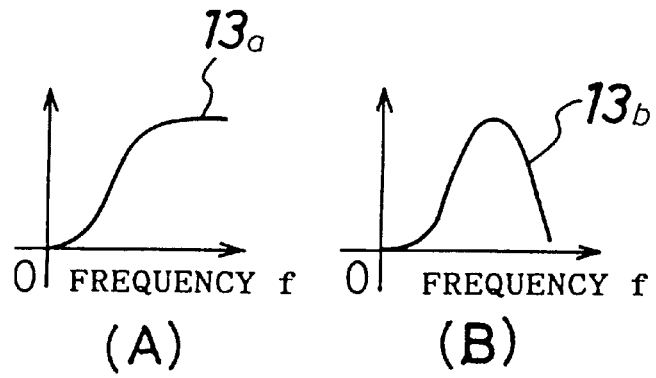
FIGS. 5(A) and 5(B) are diagrams illustrating different characteristics of a high frequency passing filter employed in the image sharpness calculation apparatus.

The high frequency filter means 24 has a similar function to that of the high frequency filter means 18 described hereinabove and applies a high frequency passing filter having such a characteristic as, for example, shown at 13a in FIG. 5(A) to the input image f to pass the high frequency component. However, a high frequency band passing filter having such a characteristic as shown at 13b in FIG. 5(B) may be employed instead.

The edge region extraction means 22 may be an edge detection filter 11a which presents such digital values as shown in FIG. 4(A) to picture elements when an image is divided into two-dimensional picture elements, or another edge detection filter 11b which presents such digital values as shown in FIG. 4(B). The edge detection filter 11a or 11b is applied to the input image f and the output of the detection filter 11a or 11b is processed with a threshold value (a region in the output formed from picture elements which have values higher than a particular value) to extract an edge region. It is to be noted that a first order differentiation filter, a second order differentiation filter, a high frequency filter, a high frequency band filter or a like filter can be used in place of the edge detection filter.

The edge area calculation means 23 calculates the edge area by integrating the number of picture elements in the edge region which have values higher than a particular value or by counting the number of picture elements in the edge region by means of an accumulator.

The normalization means 26 may either divide the intensity of an integrated high frequency component or high frequency band component by a calculated edge area or convert the same into a suitable value using a lookup table (not shown).

When an input image f is inputted to the image sharpness calculation means 21, first a high frequency component or a high frequency band component of the input image f is extracted by the high frequency filter means 24. Simultaneously, an edge region of the input image f is extracted by the edge region extraction means 22. The high frequency intensity integration means 25 calculates an absolute value or a squared value of the high frequency component or high frequency band component inputted thereto to obtain a high frequency intensity, integrates the high frequency intensity for the edge region and outputs a resulted value of the integration to the normalization means 26. The edge area calculation means 23 calculates the area of the extracted edge region and outputs the area to the normalization means 26. The normalization means normalizes the high frequency intensity inputted thereto with the edge area to calculate a sharpness S. The sharpness S obtained in this manner is used to sharpen the input image f by way of the parameter calculation means 14.

Figure 6:
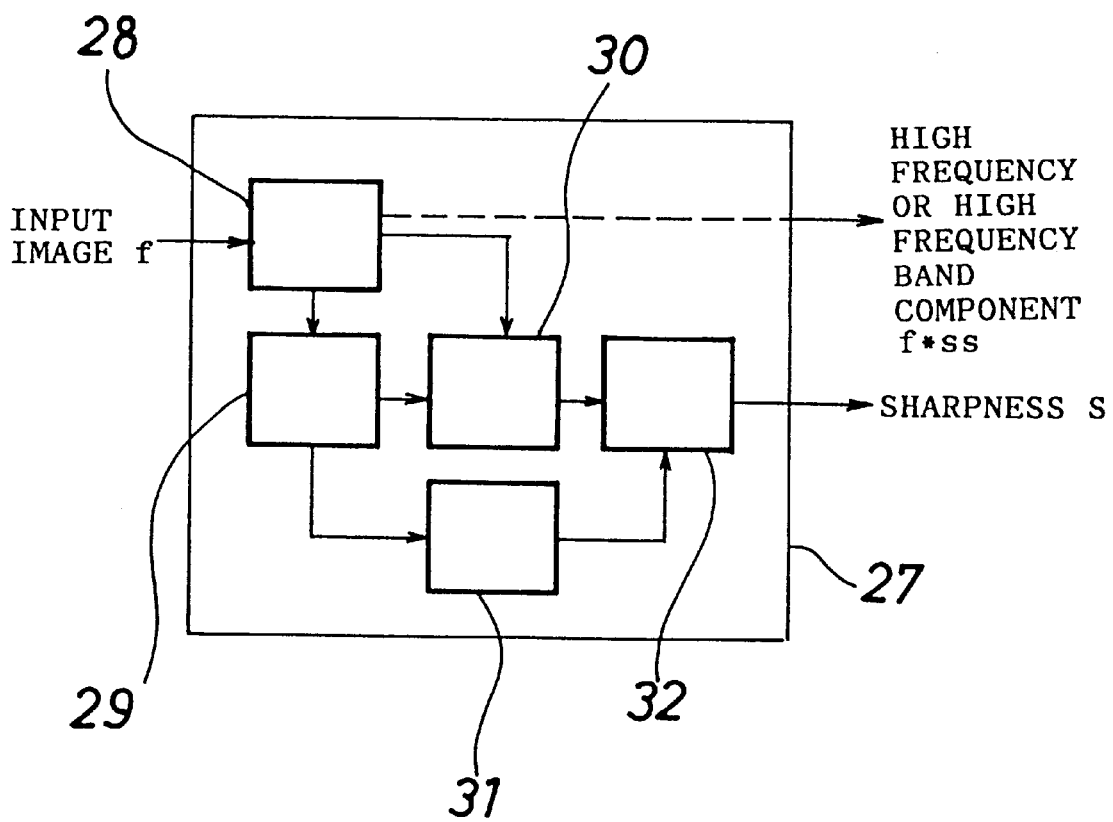
FIG. 6 is a block diagram showing a further image sharpness calculation apparatus.

Referring now to FIG. 6, there is shown a third form of the image sharpness calculation means. The image sharpness calculation means is generally denoted at 27 and includes high frequency filter means 28 for extracting a high frequency component or a high frequency band component of an input image f, threshold value processing means 29 for processing the thus extracted high frequency component or high frequency band component with a threshold value to extract an edge region, high frequency intensity integration means 30 for integrating the intensity of the thus extracted high frequency component or high frequency band component, edge area calculation means 31 for calculating the area of the extracted edge region, and normalization means 32 for normalizing the thus integrated intensity of the high frequency component or high frequency band component with the area of the edge region.

When an input image f is inputted to the image sharpness calculation means 27, first a high frequency component or a high frequency band component of the input image f is extracted by the high frequency filter means 28 and outputted to the threshold value processing means 29 and the high frequency intensity integration means 30. The threshold value processing means 29 processes the high frequency component or high frequency band component inputted thereto with a threshold value to extract an edge region and outputs the edge region to the high frequency intensity integration means 30 and the edge area calculation means 31. The high frequency intensity integration means 30 calculates an absolute value or a squared value of the high frequency component or high frequency band component inputted thereto to obtain the intensity of the high frequency component or high frequency band component, integrates the intensity with the edge region inputted thereto and outputs a resulted value of the integration to the normalization means 32.

The edge area calculation means 31 calculates the area of the edge region inputted thereto and outputs the same to the normalization means 32. The normalization means 32 normalizes the inputted integrated value of the intensity of the high frequency component or high frequency band component with the edge area to calculate a sharpness S.

Figure 7:
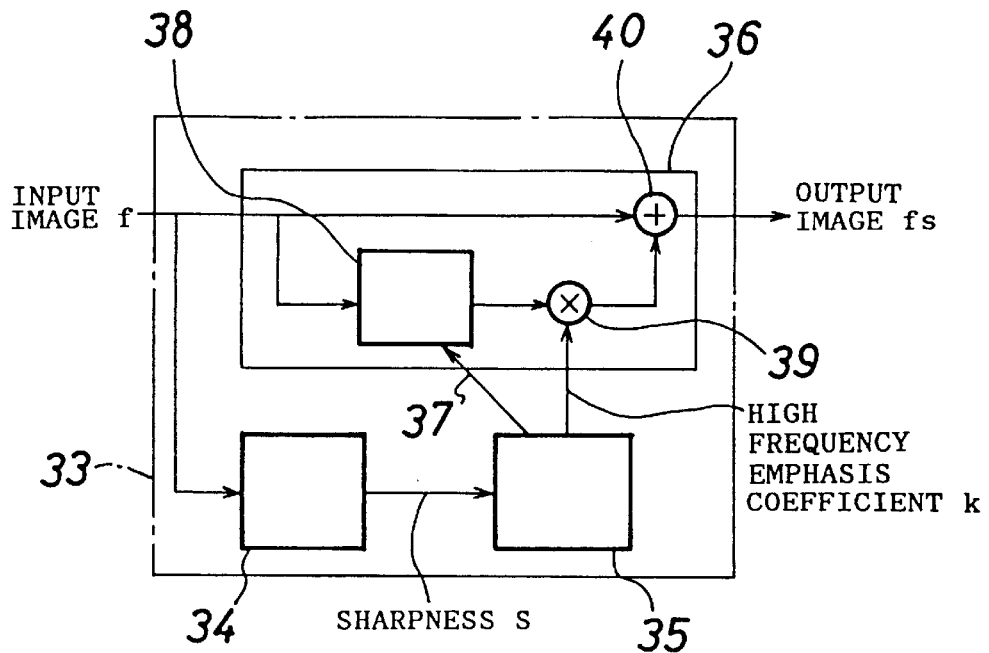
FIGS. 7 to 13 are block diagrams showing different image sharpening apparatus according to the present invention.

Referring now to FIG. 7, there is shown another image sharpening apparatus according to the present invention. The image sharpening apparatus shown is generally denoted at 33 and includes sharpness calculation means 34 for calculating a sharpness based on a high frequency component or a high frequency band component at a portion of an input image f at which the variation of the input image f exhibits a great variation, parameter calculation means 35 for calculating two sharpening parameters including a high frequency filter parameter 37 and a high frequency emphasis coefficient k based on the sharpness S calculated by the sharpness calculation means 34, and emphasis means 36 for emphasizing the intensity of the input image f based on the sharpening parameter calculated by the parameter calculation means 35.

Figure 4:
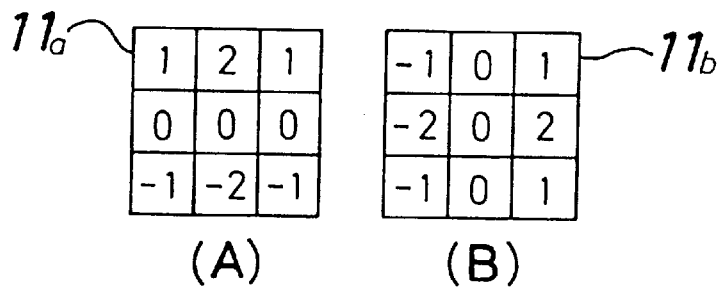
FIGS. 4(A) and 4(B) are diagrammatic views illustrating two different forms of an edge detection filter employed in the image sharpness calculation apparatus of FIG. 3.

The sharpness calculation means 34 may have a similar construction to those of the image sharpness calculation means 16, 21 and 27 described hereinabove with reference to FIGS. 2 to 4.

The emphasis means 36 includes emphasizing high frequency filter means 38 for extracting a high frequency component or a high frequency band component of an input image f based on the high frequency filter parameter 37, multiplication means 39 for multiplying the high frequency component or high frequency band component outputted from the emphasizing high frequency filter means 38 by the high frequency emphasis coefficient k, and addition means 40 for adding the output value of the multiplication means 39 and the input image f.

The emphasizing high frequency filter means 38 includes a plurality of high frequency filters or high frequency band filters and selectively applies one of the filters in response to selection information inputted thereto from the outside.

The high frequency filter parameter 37 described above is selection information for selecting one of the high frequency filters or high frequency band filters in the emphasizing high frequency filter means 38. Thus, for example, various values of the high frequency filter parameter 37 and the high frequency emphasis coefficient k are stored in lookup tables not shown. Then, the lookup tables are referred to based on the value of the sharpness S to find out corresponding values of the high frequency filter parameter 37 and the high frequency emphasis coefficient k, and the values thus found out are sent out to the emphasis means 36.

In operation, when an input image f is inputted to the sharpness calculation means 34, a high frequency component or a high frequency band component of the input image f is extracted, and an absolute value or a squared value of the high frequency component or high frequency band component is calculated to obtain a high frequency intensity, and then a sharpness S is calculated from the high frequency intensity and outputted to the parameter calculation means 35.

The parameter calculation means 35 selects a high frequency emphasis coefficient k and a high frequency filter parameter 37 based on the value of the inputted sharpness S and outputs the selected values to the image sharpening apparatus 33. The image sharpening apparatus 33 selects one of the high frequency filters or high frequency band filters which has a parameter designated by the inputted high frequency filter parameter 37, and extracts, by means of the thus selected high frequency filter or high frequency band filter, a high frequency component or a high frequency band component of the input image f, and then outputs the thus extracted high frequency component or high frequency band component to the multiplication means 39. The multiplication means 39 multiplies the thus inputted high frequency component or high frequency band component by the high frequency emphasis coefficient k. Further, the output of the multiplication means 39 and the input image f are added to each other by the addition means 40 to produce an output image fs.

Figure 8:
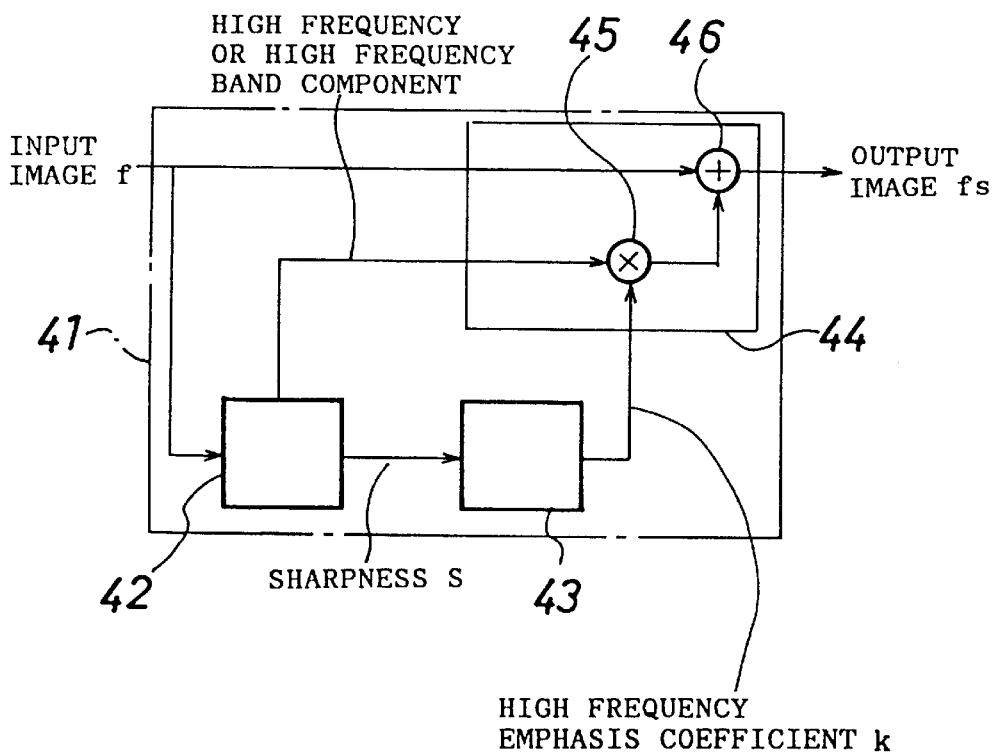

FIG. 8 shows a further image sharpening apparatus according to the present invention. The image sharpening apparatus is generally denoted at 41 and includes sharpness calculation means 42 for calculating a sharpness S based on a high frequency component or a high frequency band component at a portion of an input image f at which the brightness of the input image f exhibits a great variation, parameter calculation means 43 for calculating a high frequency emphasis coefficient k as a sharpening parameter based on the thus calculated sharpness S, and emphasis means 44 for emphasizing the brightness of the input image f based on the high frequency emphasis coefficient k calculated by the parameter calculation means 43.

The parameter calculation means 43 may include a lookup table in which various values of the high frequency emphasis coefficient k as a parameter and refer to the lookup table based on the value of the sharpness S inputted thereto.

The emphasis means 44 includes multiplication means 45 for multiplying the output of the high frequency filter means in the sharpness calculation means 42 by the high frequency intensity coefficient k, and addition means 46 for adding the input image f to the output of the multiplication means 45. Meanwhile, a high frequency component or a high frequency band component to be emphasized is inputted directly from the sharpness calculation means 42 to the emphasis means 44. Thus, the emphasis means 44 multiplies the high frequency component or high frequency band component inputted thereto from the sharpness calculation means 42 by the high frequency intensity coefficient k and adds the product and the input image f to produce an output image fs.

Figure 9:
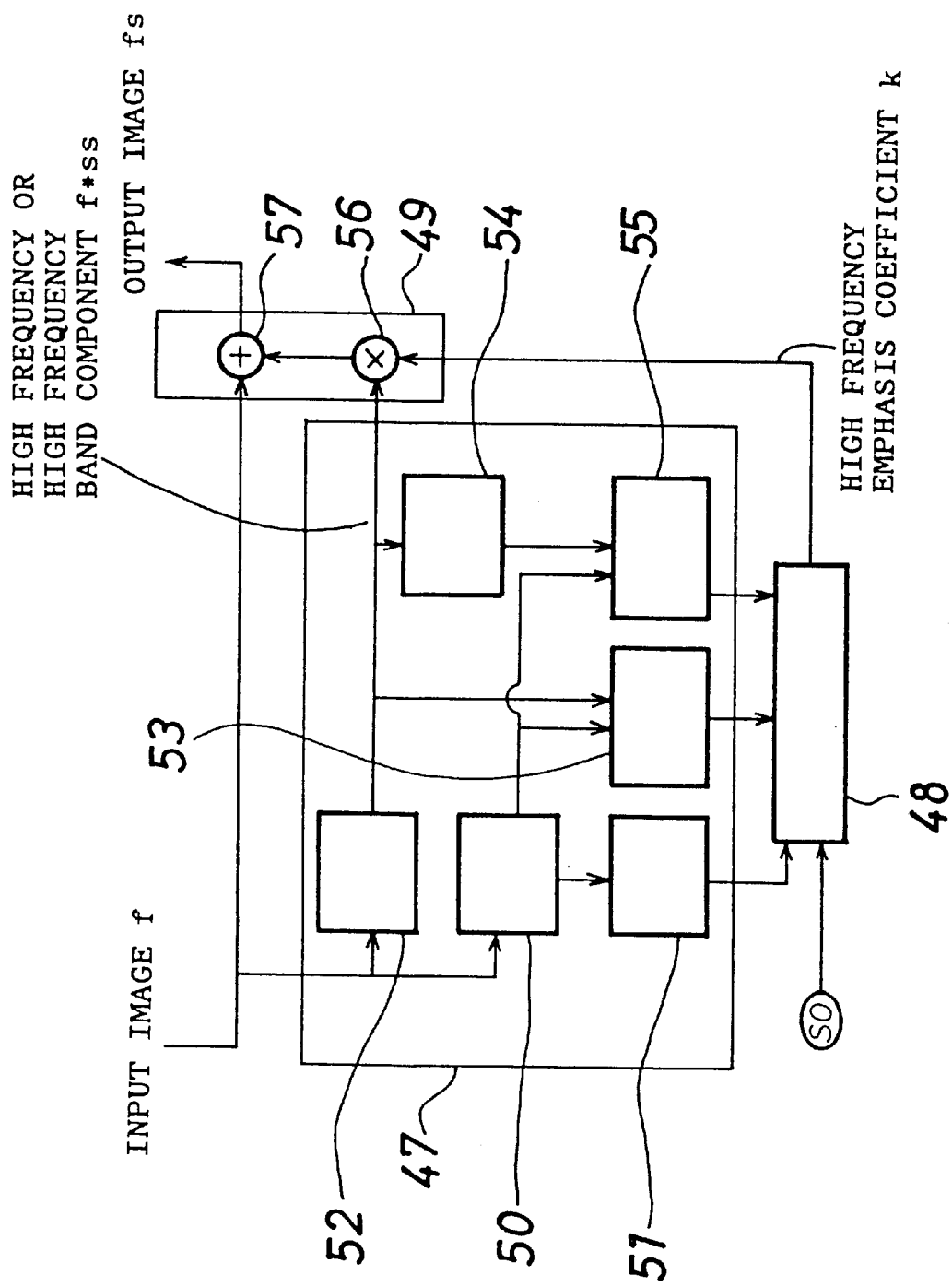

FIG. 9 shows a still further image sharpening apparatus according to the present invention. Referring to FIG. 9, the image sharpening apparatus shown includes sharpness calculation means 47. The sharpness calculation means 47 includes edge region extraction means 50 for extracting an edge region of an input image f, edge area calculation means 51 for calculating the area of the thus extracted edge region, first high frequency filter means 52 for extracting a first high frequency component or a first high frequency band component of the input image f, first high frequency intensity integration means 53 for integrating the intensity of the high frequency component or high frequency band component in the extracted edge region, second high frequency filter means 54 for extracting a second high frequency component or a second high frequency band component, which is different from the first high frequency component or first high frequency band component, from the high frequency component or high frequency band component extracted by the first high frequency filter means 52, and second high frequency intensity integration means 55 for integrating the intensity of the high frequency component or high frequency band component extracted by the second high frequency filter means 54 in the extracted edge region.

The image sharpening apparatus 47 further includes parameter calculation means 48 for calculating a high frequency emphasis coefficient k from an object sharpness SO inputted in advance thereto, the calculated edge area, the integral value of the intensity of the high frequency component or high frequency band component obtained by the first high frequency intensity integration means 53 and the integral value of the intensity of the high frequency component or high frequency band component obtained by the second high frequency intensity integration means 55.

The image sharpening apparatus further includes emphasis means 49. The emphasis means 49 includes multiplication means 56 for multiplying a high frequency component or a high frequency band component obtained by the first high frequency filter means 52 by a high frequency intensity coefficient k calculated by the parameter calculation means 48, and addition means 57 for adding the output of the multiplication means 56 and the input image f to obtain an output image fs.

The parameter calculation means 48 will be described subsequently, The object of the processing of the parameter calculation means 48 is to calculate the value of the high frequency intensity coefficient k for converting the sharpness of the input image f into an object sharpness S0. The definition of the sharpness is given by the equation (5) given hereinabove, and the following equation (9) is employed as an image emphasis equation:

$$fs = f + k(f * ss) \quad (9)$$

The equation (9) replaces the high frequency filter gs of the equation (4) with the high frequency band filter ss in the equation (5). While the high frequency band filter ss indicates the weight to the sharpness of each spatial frequency component to a human being, it may be replaced with a high frequency filter having a high frequency band cutoff function.

The sharpness S' of an image after sharpening is given by the following equation (10):

$$S' = \frac{\int\int E(fs)|fs * ss|dxdy}{AE(fs)} \quad (10)$$

$$= \frac{\int\int E(fs)|f * ss + k(f * ss) * ss|dxdy}{AE(fs)}$$

Here, the coefficient k for sharpening an image so as to vary the sharpness S' to an object sharpness SO is calculated. Thus, by transforming the equation (10) by substituting S0 into S' of the equation (10), the following equation (11) is obtained:

$$S0 \cdot AE(fs) = \int\int E(fs)|f*ss + k(f*ss)*ss|dxdy \quad (11)$$

Here, in order to simplify calculation, the equation (11) is approximated with the following equation (12):

$$S0 \cdot AE(fs) = \int\int E(fs)|f*ss|dxdy + k\int\int E(fs)|f*ss*ss|dxdy \quad (12)$$

Consequently, the following equation (13) is obtained:

$$k = \frac{S0 \cdot AE(fs) - \int\int E(fs)|f*ss|dxdy}{\int\int E(fs)|f*ss*ss|dxdy} \quad (13)$$

Here, if it is assumed that the edge region E(fs) after sharpening does not vary from that before sharpening, then $$E(fs) = E(f), \quad AE(fs) = AE(f) \quad (14)$$

Consequently, the following equation (15) is obtained from the equation (13):

$$k = \frac{S0 \cdot AE(f) - \int\int E(f)|f*ss|dxdy}{\int\int E(f)|f*ss*ss|dxdy} \quad (15)$$

In the equation (15), the first term S0 of the numerator corresponds to the object sharpness S0, the second term of the numerator corresponds to the output of the first high frequency filter means 52, and the denominator corresponds to the output of the second high frequency filter means 54. Therefore, the parameter calculation means 48 is required to have a function of calculating in accordance with the equation (15).

Figure 10:
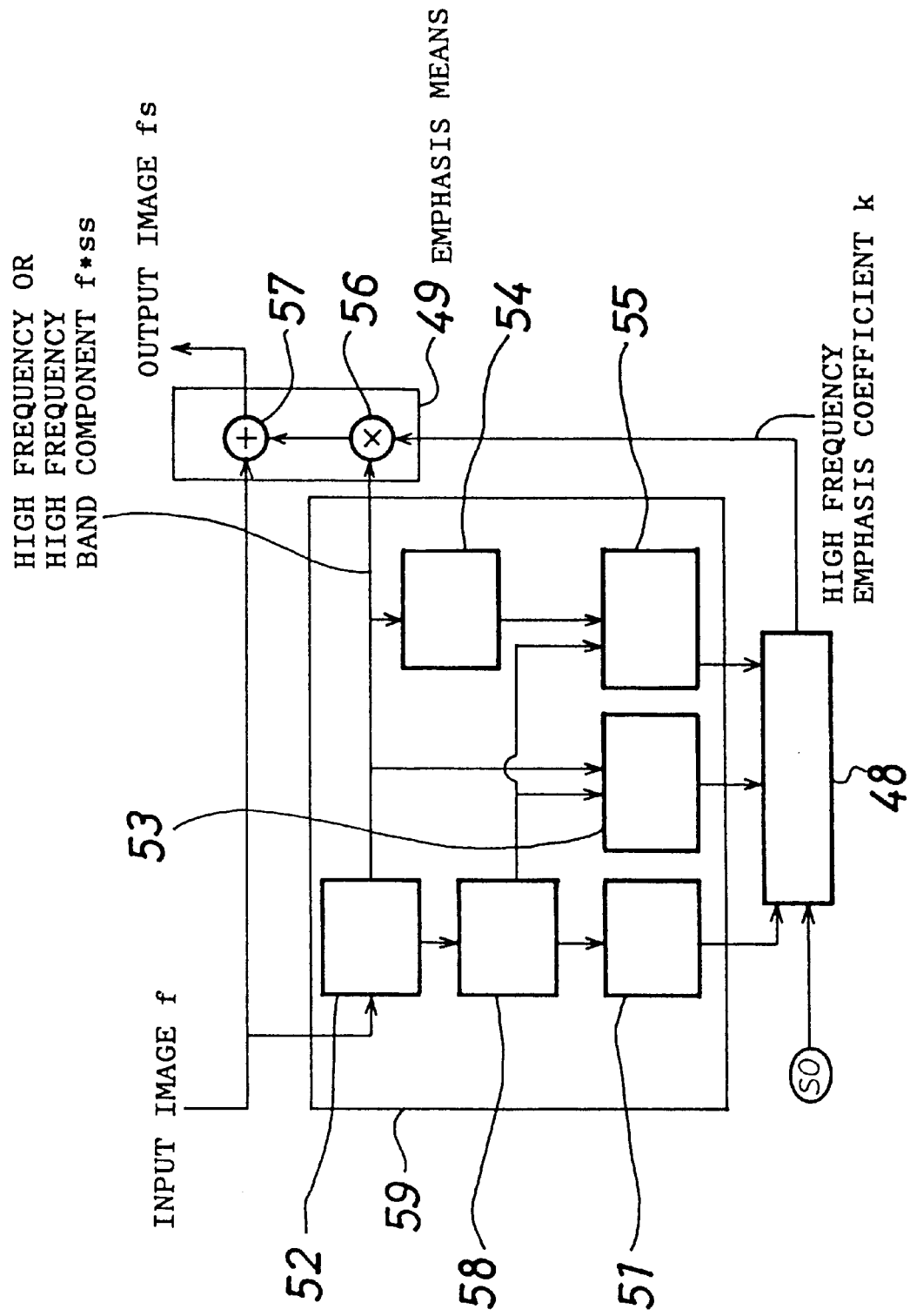

FIG. 10 shows a yet further image sharpening apparatus according to the present invention. Referring to FIG. 10, the image sharpening apparatus shown is a modification to and is different from the image sharpening apparatus shown in FIG. 9 in that it includes threshold value processing means 58 in place of the edge region extraction means 50 of the image sharpening calculation means shown in FIG. 9.

The threshold value processing means 58 processes a high frequency component or a high frequency band component obtained by the first high frequency filter means 52 with a threshold value to extract an edge region of an input image f and sends out the edge region to the edge area calculation means 51, the first high frequency intensity integration means 53 and the second high frequency intensity integration means 55.

The second high frequency filter means 54 extracts a high frequency component or a high frequency band component from the inputted high frequency component or high frequency band component and sends out the same to the second high frequency intensity integration means 55.

The edge area calculation means 51 calculates an edge area based on the extracted edge region and sends out the edge area to the parameter calculation means 48. Meanwhile, the first high frequency intensity integration means 53 and the second high frequency intensity integration means 55 convert the high frequency components or high frequency band components inputted thereto to high frequency intensities, integrate the high frequency intensities and send out resulted values of the integration to the parameter calculation means 48.

The parameter calculation means 48 calculates a high frequency intensity coefficient k based on the integral values of the high frequency intensities inputted thereto from the first high frequency intensity integration means 53 and the second high frequency intensity integration means 55 and an object sharpness S0 and sends out the high frequency intensity coefficient k to the emphasis means 49. In the emphasis means 49, the multiplication means 56 multiplies the high frequency component or high frequency band component sent out from the first high frequency filter means 52 by the high frequency intensity coefficient k. Further, the addition means 57 adds the output of the multiplication means 56 and the input image f to each other to produce an output image fs. It is to be noted that the image sharpening apparatus in the present embodiment can be produced at a lower cost than the image sharpening apparatus shown in FIG. 9 since it does not includes the edge region extraction means.

Figure 11:
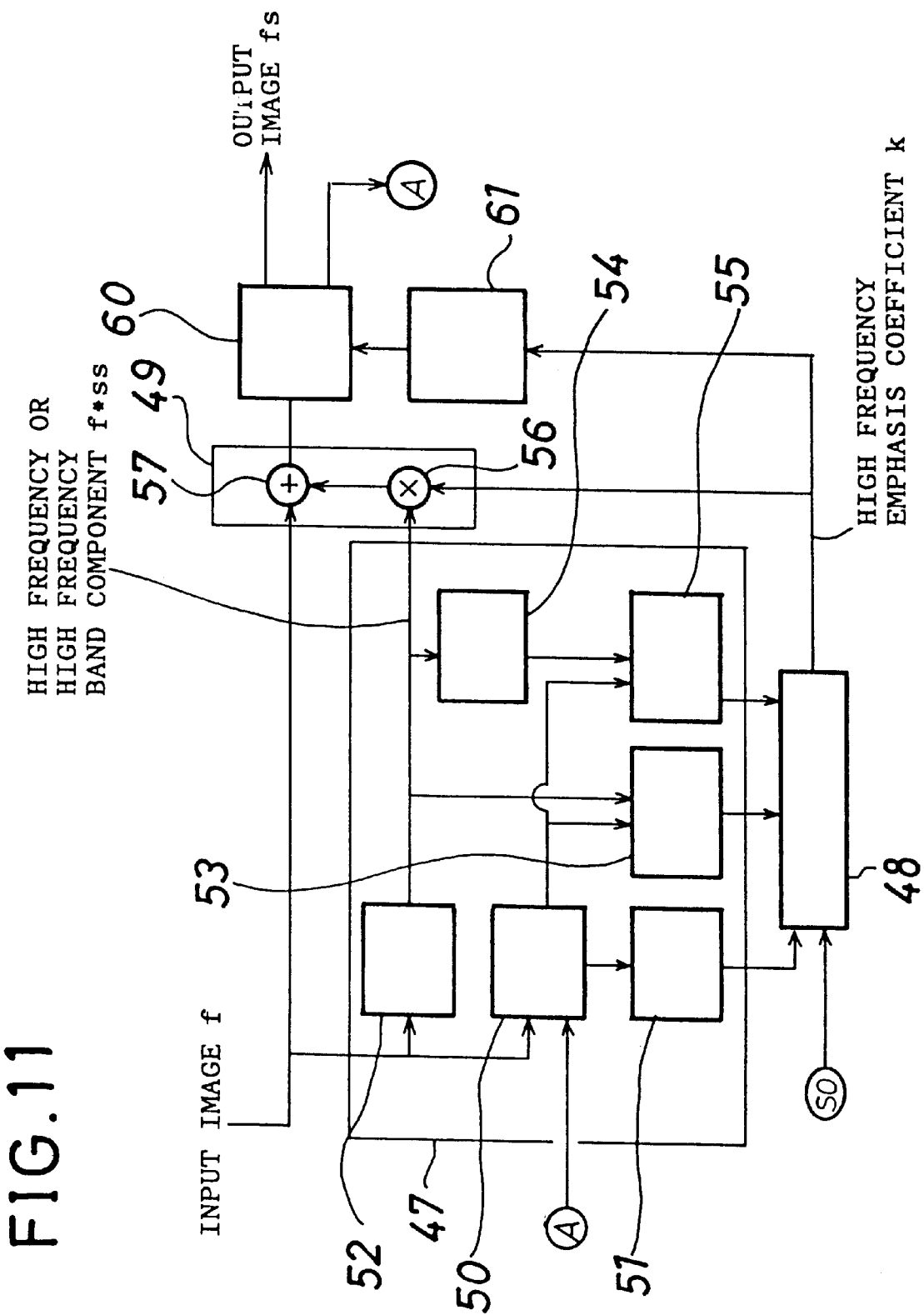

FIG. 11 shows a yet further image sharpening apparatus according to the present invention. Referring to FIG. 11, the image sharpening apparatus shown is a modification to and is different from the image sharpening apparatus shown in FIG. 9 in that it includes, in addition to the sharpness calculation means 47, the emphasis means 49 and the parameter calculation means 48 shown in FIG. 9, a selector 60 for selecting whether an output image fs of the image sharpening apparatus should be inputted back to the sharpness calculation means 47 to calculate the high frequency intensity coefficient k again or should be outputted as it is, and discrimination means 61 for comparing a high frequency intensity coefficient k used to calculate the output image fs and another high frequency intensity coefficient k used to calculate an output image fs in the last cycle with each other to determine whether or not such repetitive calculation of a high frequency intensity coefficient k is to be continued and instructing the selector 60 of the determination.

The discrimination means 61 stores a high frequency intensity coefficient k used to obtain a first output image fs. Here, the first output image is represented as fs0, and the first high frequency emphasis coefficient is represented by high frequency intensity coefficient k0.

The first output image fs0 is inputted back to the edge region extraction means 50 of the sharpness calculation means 47 by the selector 60. Consequently, a new edge region E(fs0) is obtained. Based on the edge region E(fs0), an edge area and integral values of the high frequency intensity are calculated by the edge area calculation means 51, the first high frequency intensity integration means 53 and the second high frequency intensity integration means 55, respectively, and then a next high frequency intensity coefficient k1 is calculated by the parameter calculation means 48.

Then, the multiplication means 56 and the addition means 57 operate with the high frequency intensity coefficient k1 to perform sharpening to obtain a next output image fs1. Subsequently, the high frequency intensity coefficient k1 is compared with the high frequency intensity coefficient k0 stored formerly by the discrimination means 61 to determine whether or not calculation of a high frequency emphasis coefficient should be repeated.

If it is determined that the calculation should be repeated, the discrimination means 61 now stores the high frequency intensity coefficient k1 and sends out an instruction to the selector 60 to feed back the output image fs1 to the sharpness calculation means 47 again. Consequently, a high frequency intensity coefficient k2 is obtained now and compared with the high frequency intensity coefficient k1. In this manner, the sequence of operations is repeated until the discrimination means 61 determines that the repetitive calculation should be stopped.

The criterion of the discrimination means 61 may be such that, if the absolute value of the difference between the two high frequency emphasis coefficients is lower than a particular value, the repetition is ended, but otherwise, the repetition is continued. Or, the number of repetitions may be determined in advance. Where the number of repetitions is determined in advance, the discrimination means 61 need not store any high frequency emphasis coefficient in the past.

By provision of such discrimination means 61, an edge region after sharpening is calculated, and a high frequency emphasis coefficient is calculated in accordance with the equation (13) given hereinabove in connection with the sharpening apparatus shown in FIG. 9. Consequently, a value of the sharpness which is nearer to the object sharpness S0 than that obtained by the image sharpening apparatus shown in FIG. 9 can be obtained.

Figure 12:
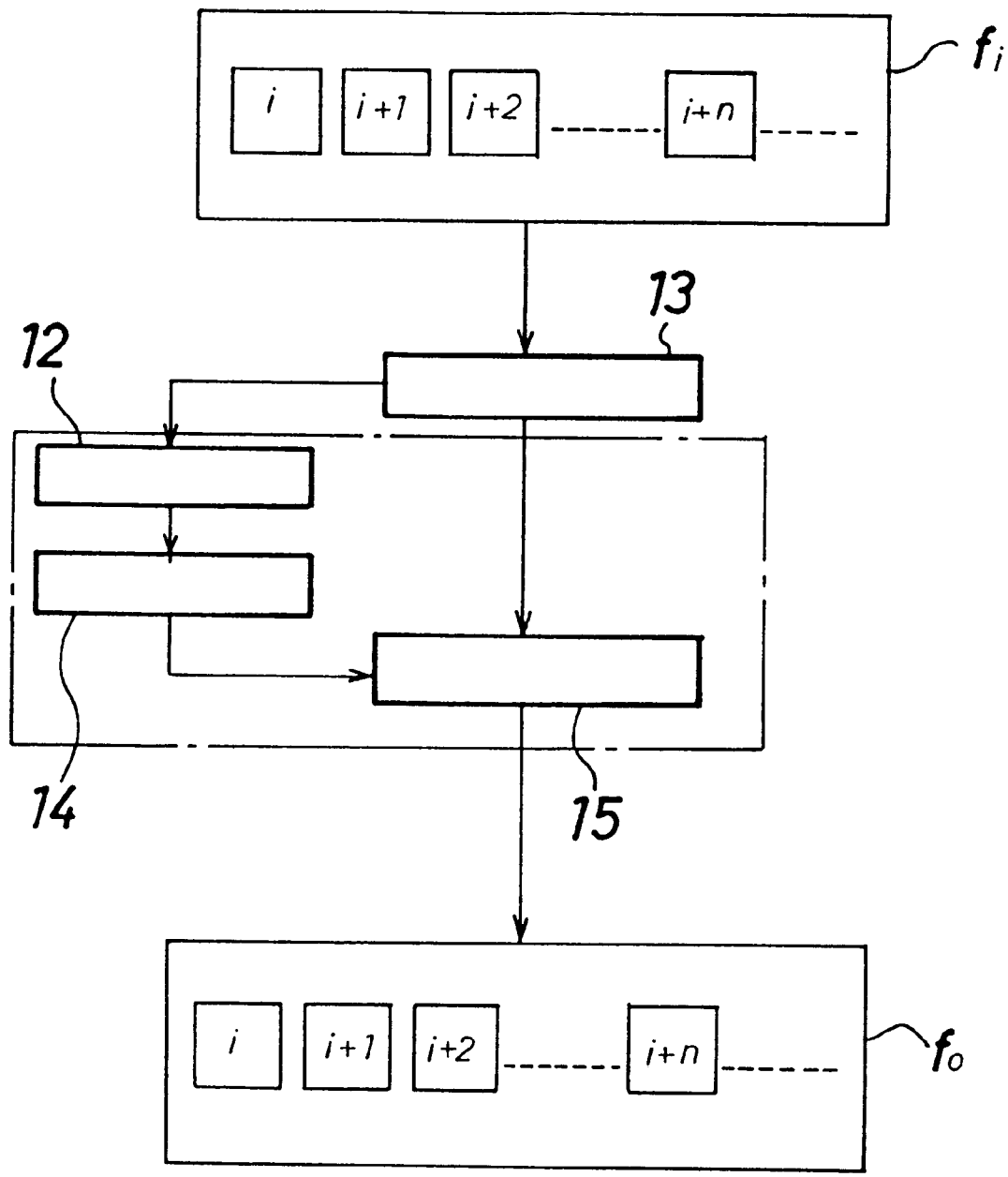

FIG. 12 shows a yet further image sharpening apparatus according to the present invention. Referring to FIG. 12, the image sharpening apparatus is characterized in that it inputs a moving picture as an input image while all of the image sharpening apparatus described above input a still picture as an input image. In particular, the present image sharpening apparatus is a modification to and is different from the image sharpening apparatus shown in FIG. 1 in that it additionally includes image sampling means 13 for sampling an image for each n (n is an integral number) frames of an input moving picture fi.

When a moving picture fi is inputted to the image sampling means 13, the image sampling means 13 samples the picture for each n frames and sends out the sample image to the sharpness calculation means 12 and the emphasis means 15. The sharpness calculation means 12 calculates a sharpness based on the sample image inputted thereto and sends out the sharpness to the parameter calculation means 14. The parameter calculation means 14 calculates a sharpening parameter based on the sharpness inputted thereto and sends out the sharpening parameter to the emphasis means 15. The emphasis means 15 produces an output moving picture fo based on the input moving picture fi and the sharpening parameter.

Meanwhile, where the sampling distance of the input moving picture fi is represented by n, when the ith image of the input moving picture fi is sampled, sharpening of the image is performed with the parameter P(i) within the time of next n frames. If n is sufficiently small, sharpening suitable to each scene of the moving picture can be achieved.

By provision of such Image sampling means 13, sharpening processing not only of a still image but also a moving picture can be performed.

Figure 13:
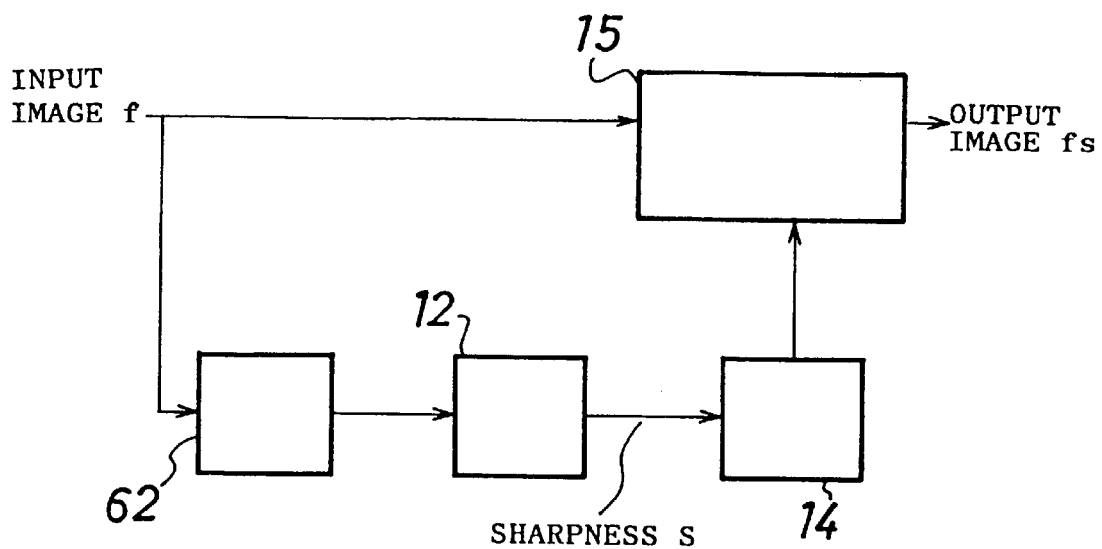

FIG. 13 shows a yet further image sharpening apparatus according to the present invention. Referring to FIG. 13, the present image sharpening apparatus is a modification to and is different from the image sharpening apparatus shown in FIG. 1 in that it additionally includes window setting means 62 provided on the input side of the sharpness calculation means for limiting the reference region of an input image f for calculating a sharpness.

In the image sharpening apparatus of the construction just described, an input image f is first inputted to the window setting means 62. The window setting means 62 thus designates a sharpness measurement region for the input image f. The sharpness measurement region may be, for example, only a central portion of the input image f, or, if the input image f is a moving picture, a portion which involves motion.

Then, data of the input image f only within the thus set sharpness measurement region are outputted to the sharpness calculation means 12. The sharpness calculation means 12 calculates a sharpness S based on brightness information of the input image f and outputs the sharpness S to the parameter calculation means 14. The parameter calculation means 14 calculates a sharpening parameter based on the sharpness S inputted thereto and outputs the sharpening parameter to the emphasis means 15. The emphasis means 15 processes the input image f by emphasis processing based on the sharpening parameter inputted thereto to sharpen the input image f.

With the image sharpening apparatus of the present embodiment, since the amount of data required for calculation of a sharpness is comparatively small, the calculation processing can be performed at a comparatively high rate. Further, if only a portion of the input image f in which an object appears is extracted, the sharpness of the object can be calculated with a higher degree of accuracy.

Further, since it is often the case that the object in the input image f is disposed at a central location, it is possible to set a window at a central portion of the screen to perform sharpening in response to the sharpness of the object in the input image f.

Having now fully described the invention, it will be apparent to one of ordinary skill in the art that many changes and modifications can be made thereto without departing from the spirit and scope of the invention as set forth herein.

What is claimed is:

1. An apparatus for producing a sharpened image from an input image, comprising:

edge extraction means for receiving the input image and extracting a portion of the input image at which the brightness of the input image exhibits a great variation and outputting the extracted portion as an edge region;

high frequency filter means for receiving the edge region from the edge extraction means and extracting a high frequency component of the input image from the edge region;

integration means for receiving the extracted high frequency component and integrating the extracted high frequency component to output a sharpness value;

parameter calculation means for receiving the sharpness value from the integration means, calculating a high frequency emphasis coefficient from the sharpness value and outputting the high frequency emphasis coefficient as a sharpening parameter; and emphasis means for receiving the sharpening parameter from the parameter calculation means and sharpening the input image based on the sharpening parameter to produce the sharpened image, said emphasis means including multiplication means for multiplying an output of said high frequency filter means by the high frequency emphasis coefficient, and addition means for adding the input image to an output of said multiplication means.

2. An apparatus for sharpening an input image as claimed in claim 1, further comprising weighting means for weighting the high frequency component extracted by the high frequency filter means with the edge region extracted by the edge extraction means, wherein the integration means integrates the thus weighted value from said weighting means.

3. An apparatus for sharpening an input image as claimed in claim 1, further comprising;

edge area calculation means for calculating an area of the edge region extracted by the edge extraction means; and normalization means for normalizing the sharpness value from said integration means with the area of the edge region from said edge area calculation means to calculate a normalized sharpness value and outputting the normalized sharpness value as the sharpness value.

4. An apparatus for sharpening an input image as claimed in claim 1, further comprising;

threshold value processing means for processing the high frequency component of the edge region of the input image extracted by the high frequency filter means with a threshold value to extract an edge region of the input image at which the brightness of the input image exhibits a variation exceeding the threshold value;

edge area calculation means for calculating an area of the edge region extracted by the threshold value processing means; and normalization means for normalizing the sharpness from said integration means with the area calculated by said edge area calculation means to produce a normalized sharpness value and outputting the normalized sharpness value as the sharpness value.

5. An apparatus for sharpening an input image as claimed in claim 1, wherein said parameter calculation means outputs a high frequency filter parameter and a high frequency emphasis coefficient as the sharpening parameters therefrom, and said emphasis means includes emphasizing high frequency filter means for extracting a high frequency component or a high frequency band component of the input image using the high frequency filter parameter, multiplication means for multiplying an output of said emphasizing high frequency filter means by the high frequency emphasis coefficient, and addition means for adding the input image to an output of said multiplication means.

6. An apparatus for sharpening an input image as claimed in claim 1, further comprising:

edge area calculation means for calculating an area of an edge region extracted by said edge extraction means;

first high frequency filter means for extracting a first high frequency component of the input image;

first integration means for integrating an output of said first high frequency filter means for the edge region;

second high frequency filter means for extracting a second high frequency component from the output of said first high frequency filter means; and second integration means for integrating an output of said second high frequency filter means for the edge region, wherein said parameter calculation means includes emphasis coefficient calculation means for calculating a high frequency emphasis coefficient from a preset object sharpness, the output of said edge area calculation means, the output of said first integration means and an output of said second integration means, and wherein said emphasis means includes multiplication means for multiplying the output of said first high frequency filter means by an output value of said emphasis coefficient calculation means, and addition means for adding an output of said multiplication means and the input image to obtain the output image.

7. An apparatus for sharpening an input image as claimed in claim 6, wherein said edge extraction means includes threshold value processing means for processing the output of said first high frequency filter means with a threshold value to extract the edge region.

8. An apparatus for sharpening an input image as claimed in claim 1, further comprising:

discrimination means for comparing a high frequency emphasis coefficient used to produce the sharpened image with another high frequency emphasis coefficient used to obtain a previously sharpened image in a last operating cycle of the apparatus to determine whether repetitive calculation for a high frequency emphasis coefficient should be continued; and a selector for selecting, in accordance with an instruction from said discrimination means, whether an output image of said apparatus should be input to the parameter calculation means to again calculate a high frequency emphasis coefficient via the emphasis coefficient calculation means.

9. An apparatus for sharpening an input image as claimed in claim 1, wherein the input image is a moving picture, and further comprising image sampling means for sampling the input moving picture for each n frames, n being a positive integral number.

10. An apparatus for sharpening an input image as claimed in claim 1, further comprising window setting means for limiting a reference region of the input image for calculation of a sharpness.

* * * * *